(12) United States Patent
White et al.

(10) Patent No.: US 7,819,951 B2
(45) Date of Patent: Oct. 26, 2010

(54) PURIFICATION OF CARBON DIOXIDE

(75) Inventors: Vincent White, Epsom (GB); Rodney John Allam, Chippenham (GB)

(73) Assignee: Air Products and Chemicals, Inc., Allentown, PA (US)

( * ) Notice: Subject to any disclaimer, the term of this patent is extended or adjusted under 35 U.S.C. 154(b) by 929 days.

(21) Appl. No.: 11/656,914

(22) Filed: Jan. 23, 2007

(65) Prior Publication Data
US 2008/0173584 A1    Jul. 24, 2008

(51) Int. Cl.
*B01D 53/14* (2006.01)
(52) U.S. Cl. .............................. 95/173; 95/174; 95/176; 95/177; 95/180; 95/183; 95/192; 95/193; 95/208; 95/209; 95/228; 95/229; 95/236; 62/617; 210/180
(58) Field of Classification Search ........... 95/172–183, 95/192–194, 208–209, 228–230, 276, 236; 62/606, 617; 210/181, 656
See application file for complete search history.

(56) References Cited

U.S. PATENT DOCUMENTS

| | | | |
|---|---|---|---|
| 3,469,410 A | 9/1969 | Schramm et al. | |
| 4,595,404 A | 6/1986 | Ozero et al. | |
| 4,602,477 A | 7/1986 | Lucadamo | |
| 4,762,543 A | 8/1988 | Pantermuehl et al. | |
| 4,952,223 A | 8/1990 | Kirshnamurthy et al. | |
| 4,977,745 A | 12/1990 | Heichberger | |
| 5,927,103 A * | 7/1999 | Howard | 62/620 |
| 5,974,829 A * | 11/1999 | Novak et al. | 62/617 |
| 6,035,662 A * | 3/2000 | Howard et al. | 62/617 |
| 6,210,467 B1 | 4/2001 | Howard | |
| 6,477,859 B2 | 11/2002 | Wong et al. | |
| 7,666,251 B2 | 2/2010 | Shah et al. | |
| 2002/0059807 A1 * | 5/2002 | Wong et al. | 62/617 |
| 2004/0123608 A1 * | 7/2004 | Kamimura et al. | 62/114 |
| 2005/0155379 A1 | 7/2005 | Gershtein et al. | |
| 2007/0231244 A1 * | 10/2007 | Shah et al. | 423/437.1 |
| 2008/0156035 A1 * | 7/2008 | Aspelund et al. | 62/606 |

FOREIGN PATENT DOCUMENTS

| | | |
|---|---|---|
| DE | 36 39 779 A1 | 6/1988 |
| EP | 0 410 845 A1 | 1/1991 |

(Continued)

OTHER PUBLICATIONS

U.S. Appl. No. 11/287,640, filed Nov. 28, 2005, Allam et al.

(Continued)

*Primary Examiner*—Duane Smith
*Assistant Examiner*—Ives Wu
(74) *Attorney, Agent, or Firm*—Willard Jones, II

(57) ABSTRACT

A first contaminant selected from oxygen and carbon monoxide is removed from impure liquid carbon dioxide using a mass transfer separation column system which is reboiled by indirect heat exchange against crude carbon dioxide fluid, the impure liquid carbon dioxide having a greater concentration of carbon dioxide than the crude carbon dioxide fluid. The invention has particular application in the recovery of carbon dioxide from flue gas generated in an oxyfuel combustion process or waste gas from a hydrogen PSA process. Advantages include reducing the level of the first contaminant to not more than 1000 ppm.

24 Claims, 3 Drawing Sheets

FOREIGN PATENT DOCUMENTS

| | | |
|---|---|---|
| EP | 0 965 564 A1 | 12/1999 |
| EP | 0 994 318 A2 | 4/2000 |
| EP | 0 964 215 B1 | 9/2004 |
| GB | 2 151 597 A | 7/1985 |
| JP | 1491608 A1 * | 12/2004 |
| WO | 03/033428 A1 | 4/2003 |
| WO | 2007/126972 A2 | 11/2007 |

OTHER PUBLICATIONS

Allam, et al., "The Oxyfuel Baseline: Revamping Heaters and Boilers to Oxyfiring by Cryogenic Air Separation and Flue Gas Recycle", Carbon Dioxide Capture for Storage in Deep Geologic Formations, Elsevier Ltd., vol. 1, 2005, pp. 451-475.

Allam, et al., "A Study of the Extraction of CO2 From the Flue Gas of a 500 MW Pulverised Coal Fired Boiler", Energy Consers. Mgmt., vol. 33, No. 5-8, 1992, pp. 373-378.

White, et al., "Purification of Oxyfuel-Derived CO2 for Sequestration or EOR", Presented at the 8$^{th}$ Greenhouse Gas Control Technologies Conference (GHGT-8), Trondheim, Jun. 2006, pp. 1-6.

Thomas, D.C.; "Carbon Dioxide Capture for Storage in Deep Geologic Formations—Results from the CO2 Capture Project, Capture and Separation of Carbon Dioxide from Combustion Sources", Elsevier; 2005; vol. 1; pp. 451-475.

* cited by examiner

PURIFICATION OF CARBON DIOXIDE

BACKGROUND OF THE INVENTION

The present invention relates to a process and apparatus for purification of impure liquid carbon dioxide ("$CO_2$") comprising a first contaminant selected from the group consisting of oxygen ("$O_2$") and carbon monoxide ("CO"). The process and apparatus have particular application in the recovery of carbon dioxide from waste carbon dioxide gas, for example flue gas from an oxyfuel combustion process or waste gas from a hydrogen ("$H_2$") pressure swing absorption ("PSA") process.

There is an urgent need to develop new processes for production of electrical energy from fossil fuels, carbonaceous fuels or hydrocarbon fuels with capture of carbon dioxide. The new processes should ideally be more efficient and cost effective than existing processes. Oxyfuel combustion processes are being considered in this context.

In oxyfuel combustion, a fuel is combusted in pure oxygen with optional recycle of cooled flue gas or steam or water to moderate the flame temperature. The elimination of the bulk of the nitrogen from the combustion results in a net flue gas which has a high carbon dioxide concentration following cooling and water condensation.

An oxyfuel combustion process is ideally suited for use in a conventional pulverized coal fired boiler for generation of steam used for electric power production. The use of oxyfuel combustion in a pulverized coal fired boiler results in a net flue gas production which, after cooling and condensation of contained water vapor, typically comprises from about 65 mol % to about 95 mol % carbon dioxide and up to about 5 mol % oxygen with the majority of the remainder being nitrogen and argon. The oxygen, nitrogen and argon are referred to as "contaminant gases".

The bulk of the oxygen in the flue gas originates from the excess oxygen required for complete coal combustion. The remaining oxygen originates from air leaking into the boiler and convection section. The nitrogen and argon in the flue gas originates from the oxygen feed for coal combustion, which would typically have a purity of 90 mol % to 99.6 mol %, and usually 95 mol % to 97 mol %, oxygen, and from air leaking into the boiler and convection section.

Also present in the flue gas are impurities such as acid gases and other impurities derived from the coal and the combustion process. The impurities include sulfur dioxide, sulfur trioxide, hydrogen fluoride, hydrogen chloride, nitric oxide, nitrogen dioxide, mercury, etc. The total amount of these impurities in the flue gas (after washing and drying) depends on the composition of the fuel and the combustion conditions.

The flue gas must be purified before carbon dioxide from the flue gas can be stored in, for example, geological formations. In this connection, water soluble components such as sulfur trioxide, hydrogen chloride and hydrogen fluoride, are usually removed from the flue gas by direct contact with water which not only washes out these components but also cools the flue gas and condenses water vapor. Sulfur dioxide and the oxides of nitrogen may be removed during compression of the carbon dioxide to pipeline pressure as disclosed in U.S. patent application Ser. No. 11/287640 filed on 28Nov. 2005, the disclosure of which is incorporated herein by reference. This process also removes any mercury that may be present in the carbon dioxide.

The pipeline pressure of carbon dioxide will usually be from about 100 bar to about 250 bar which is well above the critical pressure of carbon dioxide. The bulk of the contaminant gases is preferably removed to reduce the power required to compress the carbon dioxide and to ensure that two phase flow conditions do not arise in the pipeline or in the geological formation in which the carbon dioxide is to be stored.

The presence of oxygen may present problems when the carbon dioxide is intended for use in enhanced oil or gas recovery operations due to the possibility of oxidation causing corrosion problems in downhole equipment. The typical specifications for carbon dioxide purity would be a maximum contaminants level of 3 mol % and, in the case of the use of carbon dioxide for enhanced oil recovery, the maximum oxygen content would be typically 100 ppm or lower, even as low as 1 ppm.

The current technology for the next stage of carbon dioxide purification uses a technique in which the contaminant gases are removed from the compressed dried pre-purified crude carbon dioxide stream at about 30 bar pressure by cooling the crude carbon dioxide to a temperature very close to the freezing point of carbon dioxide, where the carbon dioxide partial pressure is from about 7 bar to about 8 bar. The residual gas containing about 25 mol % carbon dioxide is separated and vented after heating and work expansion to produce power. This single process results in a carbon dioxide recovery of about 90%. The process of oxyfuel combustion would be considerably improved if very high carbon dioxide recoveries, e.g. above 97%, could be achieved economically.

The current technology for delivery of carbon dioxide from the oxyfuel combustion of fossil fuel to a geological storage site is based on compression to a pipeline pressure of typically about 100 bar to about 250 bar. An alternative technology for smaller sources of carbon dioxide emission, or where a pipeline might be too expensive, is to liquefy the carbon dioxide and transport the carbon dioxide at a pressure below its critical pressure as a liquid in, for example, a large seaborne tanker. The oxyfuel combustion process would be significantly improved if the carbon dioxide purification process could produce economically a liquid carbon dioxide product rather than a stream of supercritical carbon dioxide at near ambient temperature for pipeline delivery.

An important objective for carbon capture in an oxyfuel power system is to provide a method of treating compressed crude carbon dioxide to remove nitrogen and argon and to reduce the concentration of oxygen to less than 100 ppm, preferably with low consumption of energy and high recovery of carbon dioxide. Carbon dioxide recovery (based on carbon dioxide in the total flue gas stream) should ideally be better than 97%. In addition, if the purified carbon dioxide product is produced as a low temperature liquid stream at a pressure below its critical pressure, transportation as a liquid or as a supercritical fluid to a carbon dioxide storage site is facilitated.

A further method of carbon dioxide capture from fossil fuels is to convert the fossil fuel to a mixture of carbon monoxide and hydrogen called synthesis gas (or "syngas") by catalytic reforming with steam; by partial oxidation; by gas heated catalytic reforming; or by any combination of these known processes, followed by shift reaction of carbon monoxide and water to produce a net hydrogen-rich product gas containing carbon dioxide as the major impurity. These processes take place at high pressures, typically from about 20 bar to 70 bar.

Hydrogen must be separated from impurities such as methane and carbon monoxide. Carbon monoxide must also be separated and purified. A preferred method of purification is to use a multi-bed pressure swing adsorption ("PSA") process to produce a pure hydrogen. A typical PSA unit, operating at 25 bar pressure, would have a typical recovery of about 85% to about 90% of hydrogen in the feed gas. The composition of the waste gas, typically at a pressure of about 1.2 bar to about 1.5 bar, depends on the method used to produce the gas from the fossil fuel. For example, the PSA waste gas from a feed produced in a steam/natural gas catalytic reformer would typically comprise at least about 60 mol % carbon dioxide, together with lower quantities of hydrogen, methane, carbon monoxide and water vapor. In this case, the objective would be to reduce the levels of carbon monoxide and methane to below 100 ppm.

FIG. 1 depicts a flow sheet for a prior art process for removal of contaminant gases from crude carbon dioxide produced in an oxyfuel combustion process. The process is disclosed in "*Carbon Dioxide Capture for Storage in Deep Geological Formations—Results from the $CO_2$ Capture Project*" (Capture and Separation of Carbon Dioxide from Combustion Sources; Vol. 1; Chapter 26; pp 451-475; Elsevier).

In FIG. 1, the carbon dioxide separation is carried out in a low temperature processing plant which uses carbon dioxide refrigeration to cool the crude carbon dioxide feed gas down to a temperature within about 2° C. of the carbon dioxide freezing temperature. At this point, a phase separation of the uncondensed gas takes place and the gas phase, containing about 25 mol % carbon dioxide and about 75 mol % contaminant gases is separated, warmed and work expanded to produce power before being vented to atmosphere.

The process separates the contaminant gases from the carbon dioxide at a temperature of −54.5° C. at a point close to the freezing temperature of the feed gas mixture, where the carbon dioxide vapor pressure is 7.4 bar. The refrigeration duty is provided by evaporating two streams of liquid carbon dioxide at pressure levels of 8.7 bar and 18.1 bar in heat exchangers E101 and E102. The two resultant carbon dioxide gas streams are fed to the carbon dioxide compressors, K101 and K102, which usually will be stages of a multistage compressor.

In FIG. 1, a feed 130 of carbonaceous fuel is combusted with a feed 132 of oxygen in an oxyfuel combustion unit R101 to produce a stream 134 of flue gas, the heat of which is used to generate steam in a power generation plant (not shown). Stream 134 is divided into a major part (stream 138) and a minor part (stream 136). Stream 138 is recycled to the oxyfuel combustion unit R101. Stream 136 of flue gas is washed with water in a gas-liquid contact vessel C105 to remove water soluble components and produce washed flue gas. A stream 142 of water is fed to the vessel C105 and a stream 144 of water comprising water soluble components from the flue gas is removed therefrom to provide a stream 146 of crude carbon dioxide gas (comprising about 73 mol % carbon dioxide).

The stream 146 is compressed in compressor K105 to produce a stream 1 of washed flue gas at a pressure of about 30 bar, which is dried to a dewpoint of less than −60° C. in a pair of thermally regenerated desiccant driers C103 to produce a stream 2 of dried waste carbon dioxide gas. Stream 2 is cooled by indirect heat exchange in the heat exchanger E101 to about −23° C. to produce a stream 3 of crude gaseous carbon dioxide which is fed to a phase separation vessel C101 where it is separated to produce first carbon dioxide-enriched liquid and a first vapor containing the majority of the contaminant gases.

A stream 4 of first carbon dioxide-enriched liquid is reduced in pressure in valve V101 to about 18 bar to produce a stream 5 of reduced pressure first carbon dioxide-enriched liquid which is vaporized by indirect heat exchange in heat exchanger E101 to provide refrigeration and to produce a stream 6 of first carbon dioxide-enriched gas.

A stream 7 of first vapor from phase separator C101 is cooled by indirect heat exchange in the heat exchanger E102 to −54.5° C. to produce a stream 8 of partially condensed fluid which is fed to a second phase separation vessel C102 where it is separated into second carbon dioxide-enriched liquid and a second vapor, containing the majority of the remaining contaminant gases.

A stream 13 of second carbon dioxide-enriched liquid is warmed to a temperature of about −51° C. by indirect heat exchange in heat exchanger E102 to produce a stream 14 of warmed second carbon dioxide-enriched liquid which is reduced in pressure to 8.7 bar in valve V102 to produce a stream 15 of reduced pressure second carbon dioxide-enriched liquid. Stream 15 is vaporized and warmed by indirect heat exchange in the heat exchangers E101, E102 to provide refrigeration and produce a stream 16 of second carbon dioxide-enriched gas. The initial warming of stream 13 in heat exchanger E102 is critical to prevent freezing of the second carbon dioxide-enriched liquid on pressure reduction from about 30 bar.

A stream 9 of the second vapor from phase separator C102 is heated by indirect heat exchange to ambient temperature in the heat exchangers E101, E102 to produce a stream 10 of warmed second gas which is heated by indirect heat exchange in pre-heater E103 to about 300° C. to produce a stream 11 of pre-heated second gas. Stream 11 is work expanded in turbine K103 to produce power and a stream 12 of waste gas comprising about 25 mol % carbon dioxide and most of the contaminant gases which is then vented the atmosphere.

Stream 16 is compressed in the first stage K102 of a multistage centrifugal carbon dioxide compressor to produce a stream 17 of compressed carbon dioxide gas at a pressure of about 18 bar. Heat of compression is removed from stream 17 in an intercooler E104 using cooling water as the coolant. A stream 18 of cooled compressed carbon dioxide gas is combined with stream 6 and the combined stream is further compressed in the second or further stage(s) K101 of the compressor to produce a stream 19 of further compressed carbon dioxide gas at a pressure of about 110 bar. The concentration of carbon dioxide in stream 19 is about 96 mol %. Heat of compression is removed from stream 19 in an aftercooler E105 using boiler feed water and/or condensate as a coolant thereby heating the boiler feed water and/or condensate and producing a stream 20 of cooled further compressed carbon dioxide gas at pipeline pressure, e.g. at about 110 bar.

For simplicity, heat exchangers E101 and E102 are shown in FIG. 1 as separate heat exchangers. However, as would be appreciated by the skilled person, heat exchangers E101 and E102 would usually, in reality, form parts of the main heat exchanger with feed streams entering and product streams leaving at the most thermodynamically efficient locations. The main heat exchanger E101, E102 is usually a multi-stream plate-fin heat exchanger, preferably made from aluminum.

Table 1 is a heat and mass balance table for the process depicted in FIG. 1.

TABLE 1

| | | Stream Number | | | | | | | | | |
|---|---|---|---|---|---|---|---|---|---|---|---|
| | | 1 | 2 | 3 | 4 | 5 | 6 | 7 | 8 | 9 | 10 |
| Temperature | °C. | 24.83 | 24.83 | −22.66 | −22.66 | −30.87 | 11.21 | −22.66 | −54.50 | −54.50 | 11.21 |
| Pressure | bar a | 30 | 30 | 29.8 | 29.8 | 18.12636 | 18.02636 | 29.8 | 29.7 | 29.7 | 29.65 |
| Flow | kg/s | 140.49 | 140.40 | 140.40 | 27.73 | 27.73 | 27.73 | 112.67 | 112.67 | 37.75 | 37.75 |
| Composition | | | | | | | | | | | |
| CO2 | mol % | 72.7633 | 72.8651 | 72.8651 | 97.6055 | 97.6055 | 97.6055 | 67.3695 | 67.3695 | 24.7546 | 24.7546 |
| N2 | mol % | 18.9694 | 18.9959 | 18.9959 | 1.5014 | 1.5014 | 1.5014 | 22.8819 | 22.8819 | 53.4392 | 53.4392 |
| Ar | mol % | 2.6956 | 2.6994 | 2.6994 | 0.3712 | 0.3712 | 0.3712 | 3.2165 | 3.2165 | 6.9090 | 6.9090 |
| O2 | mol % | 5.4316 | 5.4392 | 5.4392 | 0.5218 | 0.5218 | 0.5218 | 6.5314 | 6.5314 | 14.8960 | 14.8960 |
| H2O | mol % | 0.1396 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 4.9674 | 4.9743 | 4.9743 | 0.6929 | 0.6929 | 0.6929 | 5.9254 | 5.9254 | 12.0859 | 12.0859 |
| NO2 | ppm | 0.0043 | 0.0043 | 0.0043 | 0.0210 | 0.0210 | 0.0210 | 0.0006 | 0.0006 | 0.0000 | 0.0000 |

| | | Stream Number | | | | | | | | | |
|---|---|---|---|---|---|---|---|---|---|---|---|
| | | 11 | 12 | 13 | 14 | 15 | 16 | 17 | 18 | 19 | 20 |
| Temperature | °C. | 300.00 | 20.07 | −54.50 | −42.85 | −55.50 | 11.21 | 69.17 | 25.00 | 195.10 | 43.00 |
| Pressure | bar a | 29.65 | 1.1 | 29.7 | 29.65 | 8.743321 | 8.543321 | 18.12636 | 18.02636 | 110 | 110 |
| Flow | kg/s | 37.75 | 37.75 | 74.92 | 74.92 | 74.92 | 74.92 | 74.92 | 74.92 | 102.65 | 102.65 |
| Composition | | | | | | | | | | | |
| CO2 | mol % | 24.7546 | 24.7546 | 95.2747 | 95.2747 | 95.2747 | 95.2747 | 95.2747 | 95.2747 | 95.9012 | 95.9012 |
| N2 | mol % | 53.4392 | 53.4392 | 2.8723 | 2.8723 | 2.8723 | 2.8723 | 2.8723 | 2.8723 | 2.5038 | 2.5038 |
| Ar | mol % | 6.9090 | 6.9090 | 0.7986 | 0.7986 | 0.7986 | 0.7986 | 0.7986 | 0.7986 | 0.6837 | 0.6837 |
| O2 | mol % | 14.8960 | 14.8960 | 1.0542 | 1.0542 | 1.0542 | 1.0542 | 1.0542 | 1.0542 | 0.9111 | 0.9111 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 12.0859 | 12.0859 | 1.8913 | 1.8913 | 1.8913 | 1.8913 | 1.8913 | 1.8913 | 1.5692 | 1.5692 |
| NO2 | ppm | 0.0000 | 0.0000 | 0.0010 | 0.0010 | 0.0010 | 0.0010 | 0.0010 | 0.0010 | 0.0063 | 0.0063 |

**The process depicted in FIG. 1 produces purified carbon dioxide having a carbon dioxide concentration of about 96 mol % and containing about 0.9 mol % oxygen at a carbon dioxide recovery of about 89%.

The general concept of using distillation to purify carbon dioxide produced in an oxyfuel combustion process is not new. In this connection, Allam et al ("*A Study of the Extraction of $CO_2$ from the Flue Gas of a 500 MW Pulverized Coal Fired Boiler*", Allam and Spilsbury; Energy Consers. Mgmt; Vol. 33; No. 5-8, pp 373-378; 1992) discloses a process for purifying carbon dioxide from an oxyfuel combustion process using distillation to purify the carbon dioxide to remove "heavy" impurities (such as sulfur dioxide and nitrogen dioxide), and contaminant gases including oxygen, nitrogen and argon.

In Allam et al, the carbon dioxide system is integrated with an air separation unit ("ASU"), using expansion of both the nitrogen and oxygen streams to provide refrigeration for the carbon dioxide liquefaction process. The process recycles part of the oxygen-containing stream separated from the carbon dioxide to the boiler, taking a purge stream at this point to prevent contaminants build up. A rectifying column is used at the cold end to remove lighter contaminants from the carbon dioxide stream. A second column, also at the cold end, removes sulfur dioxide and nitrogen oxides from the resultant carbon dioxide stream.

In addition, the general idea that a distillation column could be used to remove oxygen from carbon dioxide produced oxyfuel combustion process was disclosed by the Inventors in a paper entitled "*Purification of Oxyfuel-Derived $CO_2$ for Sequestration or EOR*" presented at the 8$^{th}$ Greenhouse Gas Control Technologies conference (GHGT-8), Trondheim, in June 2006. However, no details regarding how the general idea might be implemented were disclosed.

Other prior art includes GB-A-2151597 (Duckett; published 1985) which describes a process of using membranes to concentrate a low concentration carbon dioxide feed stream so that it can be purified using phase separation. The aim is to make liquid carbon dioxide for sale rather than to recover as much carbon dioxide as possible from a combustion process and, accordingly, carbon dioxide recovery from the feed is very low at about 70%.

GB-A-2151597 discloses the use of the carbon dioxide feed stream to provide heat to the reboiler of the distillation column. GB-A-2151597 also discloses the use of an external refrigeration source to provide the liquid required for the distillation process to work.

U.S. Pat. No. 4,602,477 (Lucadamo; published July 1986) discloses a process for taking hydrocarbon offgas and increasing its value by separating it into a light hydrocarbon stream, a heavy hydrocarbon stream, and a waste carbon dioxide stream. The presence of the carbon dioxide in the stream decreases the heating and economic value of the gas. The process uses a carbon dioxide membrane unit to perform a final removal of carbon dioxide from the light hydrocarbon product, in addition to a distillation step performed at low temperatures.

The aim of the process disclosed in U.S. Pat. No. 4,602,477 is not to produce high purity carbon dioxide but to remove carbon dioxide from the hydrocarbon feed. The distillation step produces the carbon dioxide stream as a side stream from a rectifying column having a condenser. The process also uses a stripping column to purify the heavy hydrocarbon stream.

U.S. Pat. No. 4,977,745 (Heichberger; published in December 1990) discloses a process for purifying a feed stream having a carbon dioxide feed purity of greater than 85 mol %. The high pressure residual stream is heated and expanded to recover power but an external refrigeration source is used to liquefy the carbon dioxide.

EP-A-0964215 (Novakand et al; published in December 1999) discloses the recovery of carbon dioxide from a process using carbon dioxide to freeze food. The process involves the use of a distillation column to recover the carbon dioxide. The carbon dioxide feed stream to the column provides reboiler duty to the column before being fed to the column as reflux.

U.S. Pat. No. 4,952,223 (Kirshnamurthy et at published in August 1990) discloses a carbon dioxide liquefaction process in which the carbon dioxide recovery is improved by passing the vent gas to a PSA system to produce a carbon dioxide-enriched recycle stream and a carbon dioxide-depleted vent stream.

BRIEF SUMMARY OF THE INVENTION

According to a first aspect of the invention, there is provided a method for removing a first contaminant selected from oxygen and carbon monoxide from impure liquid carbon dioxide, said method comprising:
- separating said impure liquid carbon dioxide in a mass transfer separation column system to produce first contaminant-enriched overhead vapor and carbon dioxide-enriched bottoms liquid; and
- reboiling a portion of said carbon dioxide-enriched bottoms liquid by indirect heat exchange against crude carbon dioxide fluid to produce carbon dioxide-enriched vapor for said column system and cooled crude carbon dioxide fluid;

wherein said impure liquid carbon dioxide has a greater concentration of carbon dioxide than said crude gaseous carbon dioxide.

The invention has particular application in a method for recovering carbon dioxide from contaminated carbon dioxide gas comprising a first contaminant selected from the group consisting of oxygen and carbon monoxide, and at least about 60 mol % carbon dioxide, said method comprising:
- combining at least a portion of contaminated carbon dioxide gas feed with compressed first contaminant-enriched gas recycled from downstream to produce crude carbon dioxide gas;
- cooling at least a portion of said crude carbon dioxide gas by indirect heat exchange, usually with at least one process stream, to produce crude carbon dioxide fluid;
- separating impure liquid carbon dioxide comprising said first contaminant in a mass transfer separation column system to produce first contaminant-enriched overhead vapor and carbon dioxide-enriched bottoms liquid;
- reboiling a portion of said carbon dioxide-enriched bottoms liquid by indirect heat exchange against at least a portion of said crude carbon dioxide fluid to produce carbon dioxide-enriched vapor for said column system and cooled crude carbon dioxide fluid;
- further cooling at least a portion of said cooled crude carbon dioxide fluid by indirect heat exchange, usually with at least one process stream, to produce partially condensed crude carbon dioxide fluid;
- phase separating at least a portion of said partially condensed crude carbon dioxide fluid to produce said impure liquid carbon dioxide and carbon dioxide-depleted vapor;
- feeding at least a portion of said impure liquid carbon dioxide to said column system for separation;
- dividing a portion of said carbon dioxide-enriched bottoms liquid into a first part and at least one further part;
- expanding said first part to produce an expanded first part at a first pressure;
- vaporizing said expanded first part by indirect heat exchange, usually with at least one process stream, to provide a portion of the refrigeration duty required by the method and produce carbon dioxide gas;
- expanding the at least one further part to produce at least one expanded further part having a pressure that is higher than said first pressure;
- vaporizing the or each expanded further part by indirect heat exchange, usually with at least one process stream, to provide at least a portion of the remaining refrigeration duty required by the method and produce carbon dioxide gas;
- warming at least a portion of said first contaminant-enriched overhead vapor by indirect heat exchange, usually with at least one process stream, to produce warmed first contaminant-enriched gas;
- compressing at least a portion of said warmed first contaminant-enriched gas to produce said compressed first contaminant-enriched gas for recycling to said contaminated carbon dioxide gas feed; and
- compressing said carbon dioxide gases to form compressed carbon dioxide gas.

According to a second aspect of the present invention, there is provided apparatus for carrying out the method of the first aspect, said apparatus comprising:
- a mass transfer separation column system for separating said impure liquid carbon dioxide to produce first contaminant-enriched overhead vapor and carbon dioxide-enriched bottoms liquid;
- a reboiler for re-boiling carbon dioxide-enriched bottoms liquid by indirect heat exchange against crude carbon dioxide fluid to produce carbon dioxide-enriched vapor for said column system and cooled crude carbon dioxide fluid;
- a heat exchanger for further cooling cooled crude carbon dioxide fluid by indirect heat exchange, usually with at least one process stream, to produce partially condensed crude carbon dioxide fluid;
- a conduit arrangement for feeding cooled crude carbon dioxide fluid from said reboiler to said heat exchanger;
- a phase separator for phase separating said partially condensed crude carbon dioxide fluid to produce said impure liquid carbon dioxide and carbon dioxide-depleted vapor;
- a conduit arrangement for feeding partially condensed crude carbon dioxide fluid from said heat exchanger to said phase separator;
- a first pressure reduction arrangement for reducing the pressure of impure liquid carbon dioxide to produce reduced pressure impure liquid carbon dioxide;
- a conduit arrangement for feeding impure liquid carbon dioxide from said phase separator to said first pressure reduction arrangement; and
- a conduit arrangement for feeding reduced pressure impure liquid carbon dioxide from said first pressure reduction arrangement to said column system.

DETAILED DESCRIPTION OF THE INVENTION

Figure 1:
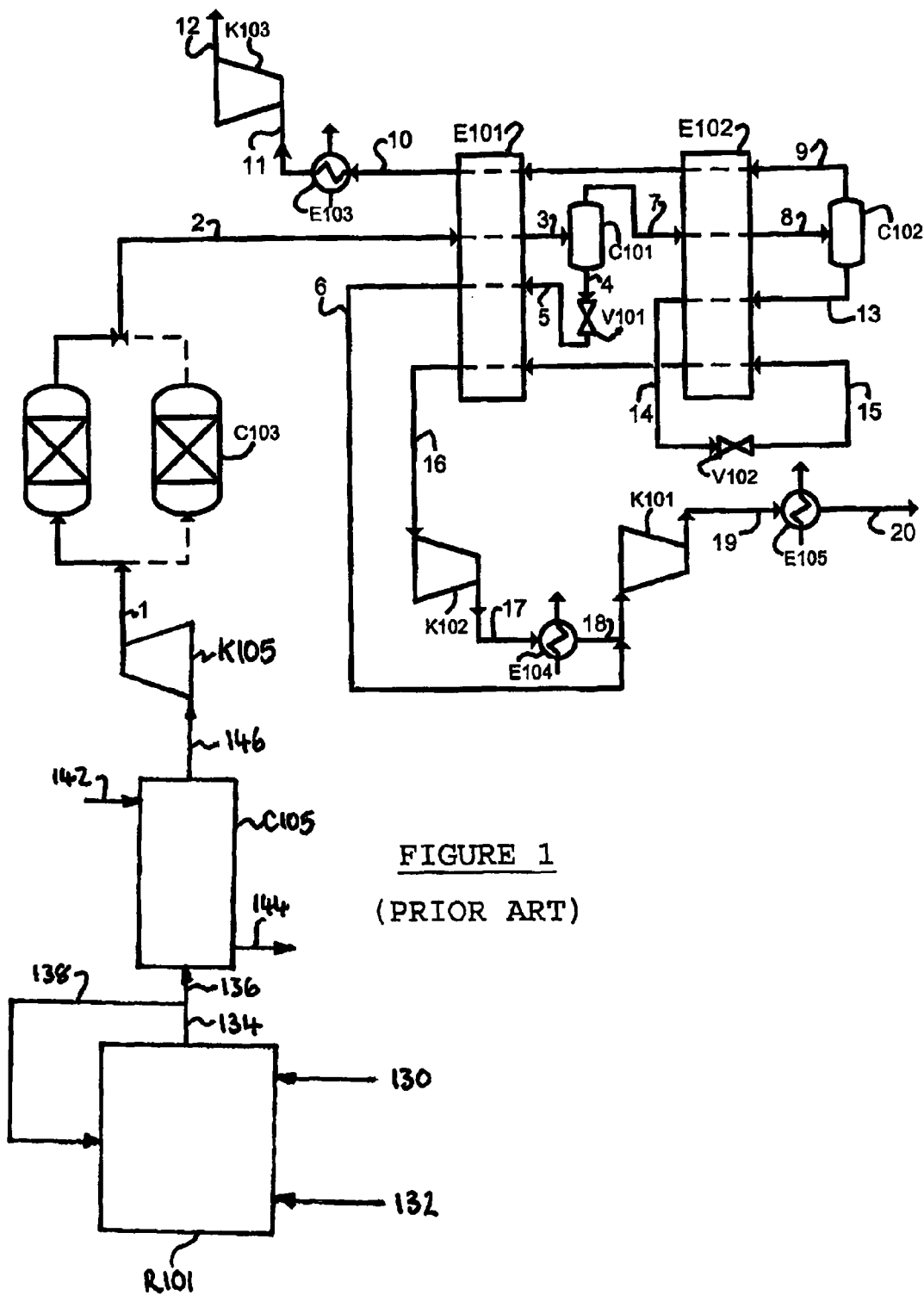
FIG. 1 is a schematic representation (flow sheet) of a prior art process for recovering carbon dioxide from flue gas generated in an oxyfuel combustion process.

The method according to the present invention comprises separating said impure liquid carbon dioxide in a mass transfer separation column system to produce first contaminant-enriched overhead vapor and carbon dioxide-enriched bottoms liquid and reboiling a portion of the carbon dioxide-enriched bottoms liquid by indirect heat exchange against crude carbon dioxide fluid to produce carbon dioxide-enriched vapor for the column system and cooled crude carbon dioxide fluid. The method is characterized in that the impure liquid carbon dioxide has a greater concentration of carbon dioxide than the crude carbon dioxide fluid.

Other contaminants are usually present in the impure liquid carbon dioxide. For example, if the method is used to recover carbon dioxide from flue gas produced in an oxyfuel combustion process, the other contaminants usually include oxygen, nitrogen and argon; oxides of sulfur (e.g. sulfur dioxide); and oxides of nitrogen (e.g. nitric oxide and nitrogen dioxide). If the method is used to recover carbon dioxide from off gas produced in a hydrogen PSA process, other contaminants usually include hydrogen; carbon monoxide; nitrogen; methane; and argon. The method of the present invention preferably also removes the bulk of these other contaminants from the impure liquid carbon dioxide.

The crude gaseous carbon dioxide typically comprises at least about 60 mol % carbon dioxide, and usually comprises no more than 90 mol % carbon dioxide. In preferred embodiments, the crude gaseous carbon dioxide comprises from at least about 65 mol % to about 90 mol %, carbon dioxide, e.g. from about 70 mol % to about 75 mol %.

The impure liquid carbon dioxide typically comprises at least about 90 mol %, and usually comprises no more than about 99 mol %, carbon dioxide. In preferred embodiments, the impure liquid carbon dioxide comprises from about 95 mol % to about 99 mol % carbon dioxide.

In preferred embodiments, the impure carbon dioxide liquid is derived from the cooled crude carbon dioxide fluid. In such embodiments, the method may further comprise:
  further cooling at least a portion of said cooled crude carbon dioxide fluid by indirect heat exchange, usually with at least one process stream, to produce partially condensed crude carbon dioxide fluid; and
  phase separating at least a portion of said partially condensed crude carbon dioxide fluid to produce said impure liquid carbon dioxide and carbon dioxide-depleted vapor.

The operating pressure(s) of the column system is usually lower than the pressure of the impure liquid carbon dioxide. Thus, in these embodiments, the pressure of the impure liquid carbon dioxide is preferably reduced to about the operating pressure of the column system without forming solid carbon dioxide prior to feeding the impure liquid carbon dioxide to the column system.

Avoiding formation of solid carbon dioxide during pressure reduction may be achieved by warming the impure liquid carbon dioxide by indirect heat exchange, usually with at least one process stream, prior to reducing the pressure thereof. For example, in the exemplified embodiments, the impure liquid carbon dioxide is warmed to about −30° C.

At least a portion of the entire refrigeration duty required by the method of the present invention is usually provided by vaporizing a portion of the carbon dioxide-enriched bottoms liquid by indirect heat exchange with at least one process stream, preferably after expansion.

The method usually comprises expanding at least a first part of the carbon dioxide-enriched liquid to produce an expanded first part at a first pressure; and vaporizing the expanded first part by indirect heat exchange, usually with at least one process stream, to provide a portion of the refrigeration duty required by the method and produce carbon dioxide gas.

The first pressure is usually from about the triple point pressure for carbon dioxide, i.e. 5.18 bar, to about 15 bar, and is preferably no more than about 6 bar.

The method preferably comprises:
  expanding at least one further part of said carbon dioxide-enriched bottoms liquid to produce at least one expanded further part having a pressure that is higher than said first pressure;
  vaporizing at least a portion of the at least one expanded further part by indirect heat exchange, usually with at least one process stream, to provide at least a portion of the remaining refrigeration duty required by the method and produce carbon dioxide gas. For example, the at least one expanded further part may be used to provide at least a portion of the refrigeration duty required to cool crude carbon dioxide gas to produce the crude carbon dioxide fluid.

The pressure(s) of the at least one expanded further part is usually from about the triple point pressure for carbon dioxide to about 20 bar. In some embodiments, there is only one further part which is expanded to a second pressure which is usually from about the triple point pressure for carbon dioxide to about 20 bar, preferably from about 12 bar to about 18 bar, e.g. about 15 bar. In other embodiments, there are two further parts, one part being expanded to the second pressure and the other part being expanded to a third pressure which is higher then the first pressure and lower than the second pressure. The third pressure is usually from about the triple point pressure for carbon dioxide to about 20 bar, preferably from about 8 bar to about 14 bar, e.g. about 10 bar.

In preferred embodiments, the majority, i.e. over 50%, of the entire refrigeration duty required by the method of the present invention is provided by vaporization of carbon dioxide-enriched bottoms liquid, usually after suitable pressure reduction(s). Preferably, at least 75% and, most preferably, at least 90% of the entire refrigeration duty is provided by such vaporization.

Any remaining refrigeration duty not provided by vaporization of carbon dioxide-enriched bottoms liquid may be provided by vaporizing an external refrigerant. However, it is preferred that the entire refrigeration duty required by the method is provided internally, i.e. without the use of an external refrigerant, by indirect heat exchange between process streams.

The expression "refrigeration duty" refers only to the sub-ambient refrigeration duty, i.e. the refrigeration duty below ambient temperature, and excludes cooling duty at a temperature at or above ambient temperature.

The carbon dioxide gas(es) produced by indirect heat exchange against at least one process stream after providing refrigeration may be compressed in a carbon dioxide compression train to pipe line pressure, e.g. from about 100 bar to about 250 bar.

At least a portion of the carbon dioxide-depleted vapor is usually warmed by indirect heat exchange with at least one process stream, e.g. to ambient temperature, to produce carbon dioxide-depleted gas. At least a portion of the carbon dioxide-depleted gas may be heated by indirect heat exchange and then work expanded to produce power and expanded carbon dioxide-depleted gas which is usually vented to the atmosphere. Typically, all of the contaminants are eventually vented in the expanded carbon dioxide-depleted gas due to the recycle of the first contaminant-enriched gas.

In preferred embodiments, the method comprises:
warming at least a portion of the carbon dioxide-depleted vapor by indirect heat exchange, usually with at least one process stream, to produce carbon dioxide-depleted gas;
pre-heating at least a portion of the carbon dioxide-depleted gas by indirect heat exchange to produce pre-heated carbon dioxide-depleted gas; and
work expanding at least a portion of the pre-heated carbon dioxide-depleted gas to produce expanded carbon dioxide-depleted gas;

wherein at least a portion of the heat required to pre-heat the carbon dioxide-depleted gas is provided by recovering heat of compression from contaminated carbon dioxide gas.

In preferred embodiments, the impure liquid carbon dioxide is fed to the column system at a location at or near the top of the or each column.

Preferred embodiments of the method comprise:
warming at least a portion of said first contaminant-enriched overhead vapor by indirect heat exchange, usually with at least one process stream, to produce warmed first contaminant-enriched gas;
compressing at least a portion of said warmed first contaminant-enriched gas to produce compressed first contaminant-enriched gas;
combining at least a portion of said compressed first contaminant-enriched gas with a contaminated carbon dioxide feed gas to form said crude carbon dioxide gas; and
cooling at least a portion of said crude carbon dioxide gas by indirect heat exchange, usually with at least one process stream, prior to providing said reboil to the column system. At least a portion of the heat of compression from the compressed first contaminant-enriched gas may be removed by indirect heat exchange with a coolant, preferably water, prior to combining with contaminated carbon dioxide gas.

The method may be applied to recover carbon dioxide from any stream of waste gas comprising at least about 60 mol % carbon dioxide. However, the method has particular application in the recovery of carbon dioxide from flue gas generated in an oxyfuel combustion process or waste gas from a hydrogen PSA process.

In some embodiments, the first contaminant is oxygen. In these embodiments, the impure liquid carbon dioxide may be produced from flue gas generated in an oxyfuel combustion process.

Flue gas from an oxyfuel combustion process is usually generated by combusting a fuel selected from the group consisting of carbonaceous fuel; hydrocarbonaceous fuel; and mixtures thereof, in the presence of pure oxygen. The flue gas is usually washed with water to remove at least the majority of water soluble contaminants and to cool the gas. The resultant washed flue gas is usually compressed to form compressed flue gas which is then usually then dried to form at least part of the crude carbon dioxide gas.

The washing step usually takes place in a counter current gas-liquid contact vessel such as a wash (or scrub) column.

The washed flue is compressed to the operating pressure of the gas drying system. In embodiments in which the gas drying system is at least one desiccant drier, the operating pressure is usually about 10 bar to about 50 bar, and preferably from about 25 bar to about 35 bar, e.g. about 30 bar. Heat of compression may be recovered from compressed flue gas to pre-heat carbon dioxide-depleted gas before work expansion and venting.

The method disclosed in U.S. Ser. No. 11/287640 (the disclosure of which has been incorporated herein by reference) may be integrated with the method of the present invention to remove at least a portion of one or more further contaminants selected from the group consisting of sulfur dioxide and $NO_x$ (i.e. nitric oxide and nitrogen dioxide) from the carbon dioxide gas in the carbon dioxide compression train. In this connection, the method of the present invention may further comprise:
compressing flue gas, or a gas derived therefrom, to an elevated pressure(s), usually from about 10 bar to about 50 bar;
maintaining said flue gas at said elevated pressure in the presence of oxygen and water and, when sulfur dioxide is to be removed, $NO_x$, for a sufficient time to covert sulfur dioxide to sulfuric acid and/or $NO_x$ to nitric acid; and
separating the sulfuric acid and/or nitric acid from the flue gas to produce sulfur dioxide-free, $NO_x$-lean crude carbon dioxide gas which is usually then fed to the gas drying system after further compression to the operating pressure thereof if necessary. One advantage of these embodiments is that any mercury present in the carbon-dioxide enriched gas is also removed.

Where the crude carbon dioxide gas comprises $SO_2$ and $NO_x$, the method preferably comprises converting $SO_2$ to sulfuric acid at a first elevated pressure and converting $NO_x$ to nitric acid at a second elevated pressure which is higher than the first elevated pressure. A portion of the $NO_x$ may be converted to nitric acid at the first elevated pressure. For example, if $SO_2$ feed concentration is sufficiently low, there could be more nitric acid than sulfuric acid produced at the first elevated pressure.

In these embodiments, the method usually comprises:
washing flue gas, or a gas derived therefrom, with water at said first elevated pressure in a first counter current gas/liquid contact device to produce $SO_2$-free carbon dioxide gas and an aqueous sulfuric acid solution;
compressing at least a portion of the $SO_2$-free carbon dioxide gas to the second elevated pressure; and
washing at least a portion of the $SO_2$-free carbon dioxide gas with water at the second elevated pressure in a second counter current gas/liquid contact device to produce $SO_2$-free, $NO_x$-lean carbon dioxide gas and an aqueous nitric acid solution. At least a portion of the $SO_2$-free, $NO_x$-lean carbon dioxide gas is then fed, after optional further compression if necessary, to the gas drying system for drying to produce said contaminated carbon dioxide gas.

At least a portion of the aqueous sulfuric acid solution is usually recycled to the first gas/liquid contact device, optionally after pumping and/or cooling. At least a portion of the aqueous nitric acid solution is usually recycled to the second gas/liquid contact device, optionally after pumping and/or cooling.

The first elevated pressure is usually from 10 bar to 20 bar and is preferably about 15 bar. Where the gaseous carbon dioxide is compressed to the first elevated pressure, such compression is preferably adiabatic. The second elevated pressure is usually from 25 bar to 35 bar and is preferably about 30 bar.

Embodiments of the present method in which the first contaminant is oxygen may be incorporated into the method disclosed in the sister application, U.S. Ser. No. (to be advised), identified by APCI Docket reference No. 07024A USA and filed on the same day as the present application, the disclosure of which is incorporated herein by reference. In this connection, the method of the present invention may comprise:

combusting a fuel selected from carbonaceous fuel; hydrocarbonaceous fuel; and mixtures thereof, in the presence of oxygen in an oxyfuel combustion unit to produce flue gas comprising carbon dioxide;

warming at least a portion of the carbon dioxide-depleted vapor by indirect heat exchange, usually with at least one process stream, to produce carbon dioxide-depleted gas;

separating carbon dioxide from at least a portion of the carbon dioxide-depleted gas by diffusion across at least one permeable membrane in a membrane separation system to produce separated carbon dioxide gas and vent gas; and feeding at least a portion of the separated carbon dioxide gas from the membrane separation system to the oxyfuel combustion unit to reduce the temperature of combustion. The vent gas may be work expanded to produce power and then vented to the atmosphere.

In other embodiments, the first contaminant is carbon monoxide. In these embodiments, the impure liquid carbon dioxide may be produced from waste gas from a hydrogen PSA process.

Carbonaceous fuel (e.g. coal) or hydrocarbonaceous fuel (e.g. methane or natural gas) may be converted to syngas by catalytic reforming with steam; partial oxidation; gas heated catalytic reforming; or any combination of these processes. Syngas may be subjected to shift reaction with water to produce hydrogen-enriched gas comprising carbon dioxide as a major component. These processes typically take place at a pressure from about 20 bar to about 70 bar.

Hydrogen may be separated from the hydrogen-enriched gas by a PSA system, usually a multi-bed PSA unit. A PSA system typically operates at about 25 bar. The composition of the waste gas stream from the PSA system depends on the fuel used but would usually comprise at least about 60 mol % carbon dioxide with lower quantities of hydrogen, methane, carbon monoxide and water.

The mass transfer separation column system usually comprises a single distillation (or stripping) column. The column is usually operated at a pressure that is lower than the pressure of the crude carbon dioxide fluid. In this connection, the operating pressure of the column is usually from about 5 bar to about 50 bar and, preferably, from about 14 bar to about 18 bar, e.g. about 16 bar. The pressure of the crude carbon dioxide fluid is usually from about 15 bar to about 60 bar and, preferably, from about 25 bar to about 35 bar, e.g. about 30 bar.

The apparatus comprises:

a mass transfer separation column system for separating impure liquid carbon dioxide to produce first contaminant-enriched overhead vapor and carbon dioxide-enriched bottoms liquid;

a reboiler for re-boiling carbon dioxide-enriched bottoms liquid by indirect heat exchange against crude carbon dioxide fluid to produce carbon dioxide-enriched vapor for the column system and cooled crude carbon dioxide fluid;

a heat exchanger for further cooling cooled crude carbon dioxide fluid by indirect heat exchange, usually with at least one process stream, to produce partially condensed crude carbon dioxide fluid;

a conduit arrangement for feeding cooled crude carbon dioxide fluid from the reboiler to the heat exchanger;

a phase separator for phase separating the partially condensed crude carbon dioxide fluid to produce the impure liquid carbon dioxide and carbon dioxide-depleted vapor;

a conduit arrangement for feeding partially condensed crude carbon dioxide fluid from the heat exchanger to the phase separator;

a first pressure reduction arrangement for reducing the pressure of impure liquid carbon dioxide to produce reduced pressure impure liquid carbon dioxide;

a conduit arrangement for feeding impure liquid carbon dioxide from the phase separator to the first pressure reduction arrangement; and a conduit arrangement for feeding reduced pressure impure liquid carbon dioxide from the first pressure reduction arrangement to the column system. The reboiler may be located either within the column system (e.g. in the sump of the column) or outside the column system connected by suitable conduit arrangement(s) as is known in the art.

An "arrangement" for carrying out a particular function is a device or devices adapted and constructed to carry out that function. In this connection, a "conduit arrangement" is any form of conduit suitable for transferring the relevant fluid between the indicated parts of the apparatus. An example of a suitable conduit arrangement is at least one pipe or pipework. However, a "conduit arrangement" may also comprise other apparatus where appropriate. For example, the conduit arrangement for feeding impure liquid carbon dioxide from the phase separator to the first pressure reduction arrangement may comprise:

a conduit arrangement for feeding impure liquid carbon dioxide from the phase separator to the heat exchanger for warming to provide warmed impure liquid carbon dioxide;

at least one fluid passage in the heat exchanger; and a conduit arrangement for feeding warmed impure liquid carbon dioxide from the heat exchanger to the first pressure reduction arrangement.

The apparatus preferably comprises:

a second pressure reduction arrangement for expanding carbon dioxide-enriched bottoms liquid to produce expanded carbon dioxide-enriched bottoms liquid at a first pressure;

a conduit arrangement for feeding carbon dioxide-enriched bottoms liquid from the column system to the second pressure reduction arrangement; and a conduit arrangement for feeding expanded carbon dioxide-enriched bottoms liquid at the first pressure from the second pressure reduction arrangement to the heat exchanger for vaporization to provide refrigeration duty.

In preferred embodiments, the apparatus comprises:

a third pressure reduction arrangement for expanding carbon dioxide-enriched bottoms liquid to produce expanded carbon dioxide-enriched bottoms liquid at a second pressure which is higher than the first pressure;

a conduit arrangement for feeding carbon dioxide-enriched bottoms liquid from column system to the third pressure reduction arrangement; and a conduit arrangement for feeding expanded carbon dioxide-enriched bottoms liquid at the second pressure from the third pressure reduction arrangement to the heat exchanger for vaporization to provide refrigeration duty. The conduit arrangement for feeding carbon dioxide-enriched bottoms liquid may feed said liquid directly from the column system or from another conduit arrangement carrying said fluid.

In certain preferred embodiments, the apparatus preferably comprises:

a fourth pressure reduction arrangement for expanding carbon dioxide-enriched bottoms liquid to produce expanded carbon dioxide-enriched bottoms liquid at a third pressure which is higher than the first pressure and lower than the second pressure;

a conduit arrangement for feeding carbon dioxide-enriched bottoms liquid from column system to the fourth pressure reduction arrangement; and a conduit arrangement for feeding the expanded carbon dioxide-enriched bottoms liquid at the third pressure from the fourth pressure reduction arrangement to the heat exchanger for vaporization to provide refrigeration duty. The conduit arrangement for feeding carbon dioxide-enriched bottoms liquid from column system to the fourth pressure reduction arrangement may feed carbon dioxide-enriched bottoms liquid directly from the column system or from another conduit arrangement carrying said fluid.

The apparatus preferably comprises:

a conduit arrangement for feeding first contaminant-enriched overhead vapor from the column system to the heat exchanger for warming to provide warmed first contaminant-enriched gas;

a recycle compressor arrangement for compressing warmed first contaminant-enriched gas to produce compressed first contaminant-enriched gas;

a conduit arrangement for feeding warmed first contaminant-enriched gas from the heat exchanger to the recycle compressor arrangement;

a conduit arrangement for combining compressed first contaminant-enriched gas from the recycle compressor arrangement with contaminated carbon dioxide gas to form crude carbon dioxide gas;

a conduit arrangement for feeding the crude carbon dioxide gas from the conduit arrangement combining said contaminated gases to the heat exchanger for cooling to provide crude carbon dioxide fluid; and a conduit arrangement for feeding crude carbon dioxide fluid from the heat exchanger to the reboiler.

The "recycle compressor arrangement" is typically a single stage compressor, usually with an aftercooler. Thus, the conduit arrangement for combining the contaminated gases may comprise:

an aftercooler for removing heat of compression from compressed first contaminant-enriched gas by indirect heat exchange with a coolant, usually water, to produce cooled compressed first contaminant-enriched gas;

a conduit arrangement for feeding compressed first contaminant-enriched gas from the recycle compressor arrangement to the aftercooler;

a conduit arrangement for combining cooled compressed first contaminant-enriched gas from the aftercooler with the contaminated carbon dioxide gas In embodiments in which the contaminated carbon dioxide gas is derived from flue gas produced in an oxyfuel combustion process, the apparatus may comprise:

an oxyfuel combustion unit for combusting a fuel selected from the group consisting of carbonaceous fuel; hydrocarbonaceous fuel; and mixtures thereof, in the presence of oxygen to produce flue gas comprising carbon dioxide;

a conduit arrangement for recycling a portion of the flue gas to the oxyfuel combustion unit;

a gas-liquid contact vessel for washing at least a part of the remaining portion of the flue gas with water to remove water soluble components and produce washed flue gas;

a conduit arrangement for feeding flue gas from the oxyfuel combustion unit to the gas-liquid contact vessel;

a flue gas compressor arrangement for compressing washed flue gas to produce compressed flue gas;

a conduit arrangement for feeding washed flue gas from the gas-liquid contact vessel to the flue gas compressor arrangement;

a gas drying system for drying compressed flue gas to produce contaminated carbon dioxide gas;

a conduit arrangement for feeding compressed flue gas from the flue gas compressor arrangement to the gas drying system; and a conduit arrangement for feeding contaminated carbon dioxide gas, or a gas derived therefrom, to the reboiler.

The "flue gas compression arrangement" is usually a single stage or multiple stage centrifugal compressor or is one or more stages of a multiple stage centrifugal compressor with optional intercooling.

In embodiments where the first contaminant is oxygen, the apparatus may comprise:

a conduit arrangement for feeding carbon dioxide-depleted vapor from the phase separator to the heat exchanger for warming to produce carbon dioxide-depleted gas;

a membrane separation system comprising at least one permeable membrane for separating carbon dioxide from carbon dioxide-depleted gas by diffusion across said membrane(s) to produce separated carbon dioxide gas and vent gas;

a conduit arrangement for feeding carbon dioxide-depleted gas from the heat exchanger to the membrane separation system;

an oxyfuel combustion unit for combusting a fuel selected from the group consisting of carbonaceous fuel; hydrocarbonaceous fuel; and mixtures thereof, in the presence of oxygen to produce flue gas comprising carbon dioxide; and a conduit arrangement for feeding separated carbon dioxide gas from the membrane separation system to the oxyfuel combustion unit.

In embodiments in which the waste carbon dioxide gas is flue gas produced in an oxyfuel combustion process, the apparatus usually comprises:

a gas-liquid contact vessel for washing at least a portion of said flue gas with water to remove water soluble components and produce washed flue gas;

a conduit arrangement for feeding flue gas from the oxyfuel combustion unit to the gas-liquid contact vessel;

a first compressor arrangement for compressing washed flue gas to produce compressed flue gas;

a conduit arrangement for feeding washed flue gas from the gas-liquid contact vessel to the first compressor arrangement;

a gas drying system for drying compressed flue gas to produce contaminated carbon dioxide gas;

a conduit arrangement for feeding compressed flue gas from said first compressor arrangement to said gas drying system; and a conduit arrangement for feeding contaminated carbon dioxide gas, or a gas derived therefrom, to the heat exchanger.

In embodiments including the removal of one or more contaminants selected from the group consisting of $SO_2$ and $NO_x$ from crude carbon dioxide gas, said apparatus may comprise:

at least one counter current gas/liquid contact device for washing flue gas with water at elevated pressure in the presence of oxygen and, when $SO_2$ is to be removed, $NO_x$, for a sufficient time to convert $SO_2$ to sulfuric acid and/or $NO_x$ to nitric acid;

a conduit arrangement for feeding flue gas at elevated pressure from said first compressor arrangement to the or each respective gas/liquid contact device; and a conduit arrangement(s) for recycling aqueous sulfuric acid solution and/or aqueous nitric acid solution to the or each respective gas/liquid contact device.

In embodiments where the first compressor arrangement is a multi-stage compressor, the apparatus may comprise:

a first compressor for compressing flue gas, or a gas derived therefrom, to a first elevated pressure;

a conduit arrangement for feeding flue gas, or a gas derived therefrom, to said first compressor;

a first counter current gas/liquid contact device for washing compressed flue gas with water at the first elevated pressure for a sufficient time to produce $SO_2$-free carbon dioxide gas and an aqueous sulfuric acid solution;

a conduit arrangement for feeding compressed flue gas at the first elevated pressure from the first compressor to the first gas/liquid contact device;

a conduit arrangement for recycling aqueous sulfuric acid solution to the first gas/liquid contact column;

a second compressor for compressing $SO_2$-free carbon dioxide gas to a second elevated pressure which is higher than the first elevated pressure;

a conduit arrangement for feeding $SO_2$-free carbon dioxide gas from the first counter current gas/liquid contact device to the second compressor;

a second counter current gas/liquid contact device for washing $SO_2$-free carbon dioxide gas with water at the second elevated pressure for a sufficient time to produce $SO_2$-free, $NO_x$-lean carbon dioxide gas and an aqueous nitric acid solution;

a conduit arrangement for feeding $SO_2$-free carbon dioxide gas at the second elevated pressure from the second compressor to the second gas/liquid contact device;

a conduit arrangement for recycling aqueous nitric acid solution to the second gas/liquid contact device; and a conduit arrangement for feeding $SO_2$-free, $NO_x$-lean carbon dioxide gas from said second counter current gas/liquid contact device to said gas drying system. The first and second compressors are preferably stages of a multi-stage carbon dioxide compression arrangement.

A "pressure reduction arrangement" is typically a pressure reduction valve and the first, second, third and fourth pressure reduction arrangements are preferably separate pressure reduction valves.

In embodiments for the purification of waste gas from a hydrogen PSA system, the apparatus may comprise:

a hydrogen PSA system for separating crude hydrogen gas comprising carbon dioxide and carbon monoxide to produce hydrogen gas and waste carbon dioxide gas comprising carbon monoxide;

a second compression arrangement for compressing waste carbon dioxide gas to produce compressed waste carbon dioxide gas;

a conduit arrangement for feeding waste carbon dioxide gas from the hydrogen PSA system to the second compression arrangement;

a gas dryer system for drying compressed waste carbon dioxide gas to produce dried waste carbon dioxide gas;

a conduit arrangement for feeding compressed waste carbon dioxide gas to the gas dryer system; and a conduit arrangement for feeding dried waste carbon dioxide gas, or a gas derived therefrom, the reboiler.

The heat exchanger is usually a multi-stream plate fin heat exchanger having a plurality of fluid passages in which cooling stream(s) flow counter currently to warming stream(s). It is desirable that the feed streams enter and the product streams leave the main heat exchanger usually at the most thermodynamically efficient locations. The heat exchanger is usually made from aluminum.

The present invention will now be described by way of example only and with reference to FIGS. 2 and 3.

Figure 2:
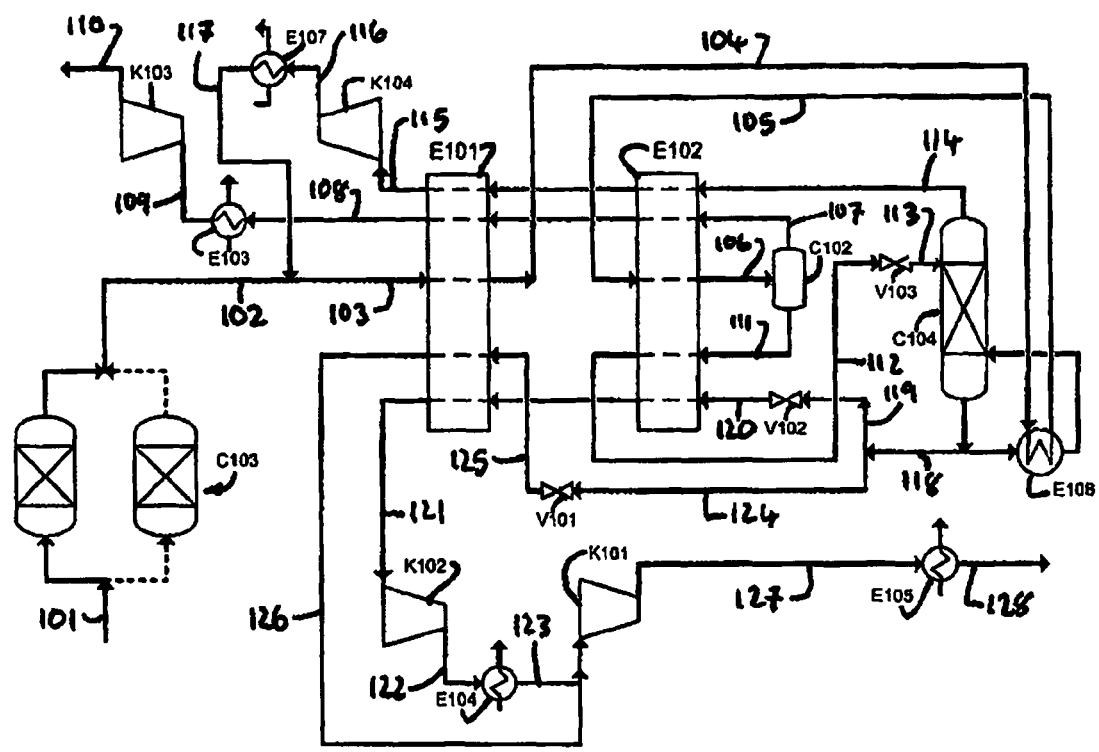
FIG. 2 is a schematic representation (flow sheet) of embodiments of the present invention in which refrigeration duty is provided by two streams of expanded carbon dioxide-enriched liquid.

Much of the embodiment of the process of the present invention depicted in FIG. 2 is similar to the prior art process depicted in FIG. 1. Both processes are for the recovery of carbon dioxide from flue gas generated in an oxyfuel combustion process in power generation plant (not shown). The primary distinction between the prior art process of FIG. 1 and the process depicted in FIG. 2 is that phase separator C101 in FIG. 1 has been eliminated and a distillation (or stripping) column C104 has been added.

Referring to FIG. 2, a stream 101 of waste gas, such as that of stream 1 of the prior art process of FIG. 1 comprising about 73 mol % carbon dioxide, is fed to a pair of thermally regenerated desiccant driers C103 where it is dried to produce a stream 102 of contaminated carbon dioxide gas. Stream 102 is combined with a stream 117 of compressed oxygen-enriched gas recycled from downstream (see below) to form a stream 103 of crude carbon dioxide gas. Stream 103 is cooled by indirect heat exchange in heat exchanger E101 against a stream 125 of carbon dioxide-enriched liquid at a pressure of about 14.4 bar (see below) to produce a stream 104 of crude gaseous carbon dioxide and a stream 126 of carbon dioxide-enriched gas.

Stream 104 is fed to reboiler E106 to reboil carbon-dioxide-enriched bottoms liquid in column C104 to produce carbon dioxide-enriched vapor for the column C104 and a stream 105 of cooled crude carbon dioxide gas, a portion of which may be condensed. Stream 105 is further cooled in heat exchanger E102 by indirect heat exchange to produce a stream 106 of partially condensed crude carbon dioxide gas. All of stream 106 is fed to a cold end phase separation vessel C102 operating at about −54° C. where it is separated into carbon dioxide-depleted vapor and impure liquid carbon dioxide.

A stream 107 of the carbon dioxide-depleted vapor is warmed to ambient temperature in heat exchangers E102 and E101 by indirect heat exchange to produce a stream 108 of carbon dioxide-depleted gas which is heated by indirect heat exchange in pre-heater E103 to produce a stream 109 of heated carbon dioxide-depleted gas at about 300° C. and about 30 bar. Stream 109 is work expanded in turbine K103 to produce power and a stream 110 of expanded carbon dioxide depleted gas which is vented to the atmosphere. Stream 110 comprises about 25 mol % carbon dioxide, about 53 mol % nitrogen, about 7 mol % argon, about 15 mol % oxygen and about 13 ppm nitric oxide.

A stream 111 of the impure carbon dioxide liquid comprising about 95 mol % carbon dioxide, 1.1 mol % oxygen and about 3.7 % total nitrogen and argon is removed from the phase separator C102, warmed to about −30° C. by indirect heat exchange in heat exchanger E102 to produce a stream 112 of warmed impure carbon dioxide liquid and then expanded from about 30 bar to about 16 bar in valve V103 to produce a stream 113 of expanded impure carbon dioxide liquid which is fed to the top of the column C104.

The impure carbon dioxide liquid comprising about 1 mol % oxygen is separated in column C104 to produce oxygen enriched-overhead vapor and carbon dioxide-enriched bottoms liquid. The action of the stripping process is to reduce the oxygen concentration in the carbon dioxide extracted from the column to no more than 10 ppm and the nitrogen and argon level to about 280 ppm. The bottoms liquid is reboiled by indirect heat exchange against crude gaseous carbon dioxide in reboiler E106 (see above) to provide carbon dioxide-enriched vapor for the column.

The oxygen-enriched overhead vapor contains about 69% carbon dioxide, 6.9% oxygen and 24.1% nitrogen plus argon. The carbon dioxide concentration is too high to allow this vapor to be vented. Therefore, a stream 114 of the oxygen-enriched overhead vapor is warmed by indirect heat exchange against cooling crude gaseous carbon dioxide in heat exchangers E102 and E101 to produce a stream 115 of warmed oxygen-enriched gas. Stream 115 is compressed from about 16 bar to about 30 bar in compressor K104 to produce a stream 116 of compressed oxygen-enriched gas and the heat of compression removed by indirect heat exchange with a coolant, usually water, in aftercooler E107 to produce the stream 117 of compressed oxygen-enriched gas which is recycled to stream 102 (see above). The result of recycling stream 117 is that the entire portion of the separated gases is eventually discharged from the turbine K103 and vented to the atmosphere as stream 110.

A stream 118 of the carbon dioxide-enriched bottoms liquid is divided into two portions, stream 119 and stream 124. Refrigeration for the process is provided in part by expanding stream 119 to a pressure of about 5.6 bar in valve V102 to produce a stream 120 of expanded carbon dioxide-enriched liquid and then vaporizing and warming stream 120 in heat exchangers E102 and E101 thereby producing a stream 121 of carbon dioxide-enriched gas. Further refrigeration is provided by expanding stream 124 to a pressure of about 14.4 bar in valve 101 to produce a stream 125 of expanded carbon dioxide-enriched liquid and then vaporizing and warming stream 125 in heat exchanger E101 to produce a stream 126 of carbon dioxide-enriched gas.

Streams 121 and 126 are compressed and combined in a multistage centrifugal compressor K101, K102 to produce a stream 128 of compressed carbon dioxide gas at a pressure of about 110 bar. The compressed carbon dioxide gas comprises over 99.9 mol % carbon dioxide and only about 10 ppm oxygen. The remaining portion consists of very small quantities of nitrogen, argon and nitrogen oxides.

Carbon dioxide compressor K101, K102 is an integrally geared machine with multiple radial stages. K101 has three or four stages, optionally with intercooling between some stages although not within the last two stages because of the fact that the discharge pressure is above the critical pressure. K102 is one or two stages of the same machine with an intercooler and an aftercooler.

in the exemplified embodiment, some or all of the stages of the compressor K101, K102 are operated adiabatically and, thus, heat of compression is recoverable from the compressed carbon dioxide gas by indirect heat exchange with coolants using an intercooler E104 and an aftercooler E105. The coolant in intercooler E104 is water. The coolant in aftercooler E105 may be boiler feed water and/or condensate for the power generation plant thus heat of compression can be used to pre-heat these streams.

Stream 121 is compressed in the initial stage K102 of the compressor to produce a stream 122 of compressed carbon dioxide gas. Heat of compression is removed from stream 122 by indirect heat exchanger with cooling water in intercooler E104 to produce a stream 123 of cooled compressed carbon dioxide gas at a pressure of about 14.4 bar. Stream 123 is combined with stream 126 and the combined stream is compressed in the remaining stage(s) K101 of the compressor to produce a stream 127 of further compressed carbon dioxide gas. Heat of compression is removed from stream 127 by indirect heat exchange with boiler feed water and then condensate in aftercooler E105 to produce the stream 128 of compressed carbon dioxide gas at pipeline pressure, e.g. about 110 bar. K101 may also have at least one intercooler, cooled using cooling water, if it is not desirable to recover all of the heat to boiler feed water and/or condensate.

Figure 3:
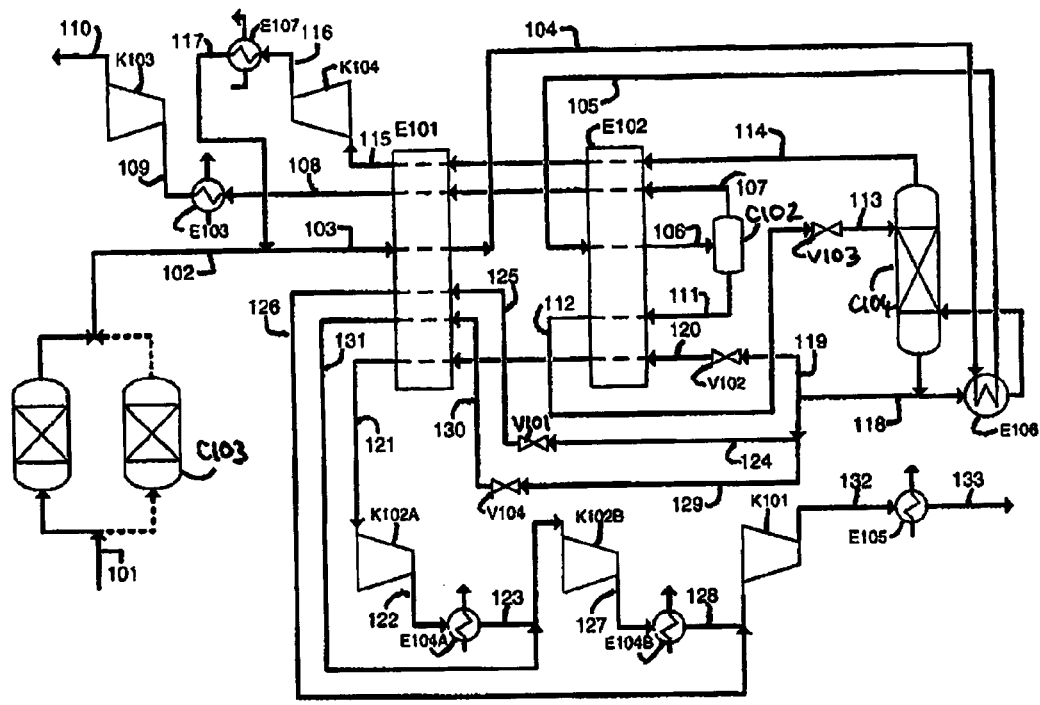
FIG. 3 is a schematic representation (flow sheet) of embodiments of the present invention in which refrigeration duty is provided by three streams of expanded carbon dioxide-enriched liquid.

The embodiment depicted in FIG. 3 is similar to the embodiment depicted in FIG. 2. The main difference between the two embodiments is that, in FIG. 3, three streams of expanded carbon dioxide-enriched liquid are used to provide refrigeration for the process rather than the two streams used in the embodiment of FIG. 2. The same reference numerals have been used in FIG. 3 as in FIG. 2 to denote the common features between the two embodiments. The following is a discussion of only the additional features of the embodiment in FIG. 3.

Referring to FIG. 3, stream 118 of the carbon dioxide-enriched liquid from column C104 is divided into three portions; stream 119, stream 124 and stream 129. Further refrigeration for the process is provided by expanding stream 129 to a pressure of about 10 bar in valve 104 to produce a stream 130 of expanded carbon dioxide-enriched liquid and then vaporizing and warming stream 130 in heat exchanger E101 to produce a stream 131 of carbon dioxide-enriched gas.

Streams 121, 126 and 131 are compressed and combined in a multistage centrifugal compressor K101, K102A, K102B to produce a stream 133 of compressed carbon dioxide gas at a pressure of about 110 bar. The compressed carbon dioxide gas comprises 99.9 mol % carbon dioxide and only about 10 ppm oxygen. The remaining portion consists of very small quantities of nitrogen, argon and nitrogen oxides.

As in the embodiment depicted in FIG. 2, some or all of the stages K101, K102A, K102B of the compressor are operated adiabatically and, thus, heat of compression is recoverable from the compressed carbon dioxide gas by indirect heat exchange with coolants using intercoolers E104A, E104B and an aftercooler E105.

Heat of compression can be used in this way to pre-heat boiler feed water and condensate. In this connection, stream 121 is compressed in the initial stage(s) K102A of the compressor to produce a stream 122 of compressed carbon dioxide gas. Heat of compression is removed from stream 122 by indirect heat exchanger with cooling water in intercooler E104A to produce a stream 123 of cooled compressed carbon dioxide gas at a pressure of about 10 bar. Stream 123 is combined with stream 131 and the combined stream is compressed in the intermediate stage(s) K102B of the compressor to produce a stream 127 of further compressed carbon dioxide gas. Heat of compression is removed from stream 127 by indirect heat exchange with cooling water in intercooler E104B to produce stream 128 of further compressed carbon dioxide gas at a pressure of about 17 bar. Stream 128 is combined with stream 126 and compressed in the final stage(s) K101 of the compressor to produce a stream 132 of compressed carbon dioxide gas at a pressure of about 110 bar. Heat of compression is removed from stream 132 by indirect heat exchange with boiler feed water and then condensate in aftercooler E105 to produce stream 133 of compressed carbon dioxide.

EXAMPLE 1

A computer simulation has been carried out using commercially available simulation software (Aspen Plus Version 2004.1) in which the process depicted in FIG. 2 is integrated with an oxyfuel combustion process in a power generation plant. A heat and mass balance table for the simulation is provided in Table 2.

The simulation achieved the required level of carbon dioxide purity of over 97 mol % (actually about 99.9 mol %), with about 87.4% carbon dioxide recovery. However, the specific power consumption is increased by 3% and carbon dioxide recovery reduced by 1.6% compared to the prior art process shown in FIG. 1.

A computer simulation (Aspen Plus Version 2004.1) of the same process but vaporizing a third level of liquid carbon dioxide to provide further refrigeration (FIG. 3) indicates that overall power consumption can be reduced by about 13% compared to the process depicted in FIG. 1.

TABLE 2

| | | \multicolumn{10}{c}{Stream Number} | | | | | | | | | |
|---|---|---|---|---|---|---|---|---|---|---|
| | | 101 | 102 | 103 | 104 | 105 | 106 | 107 | 108 | 109 | 110 |
| Temperature | °C. | 24.83 | 24.83 | 24.85 | −4.08 | −19.64 | −53.70 | −53.70 | 11.70 | 300.00 | 62.76 |
| Pressure | bar a | 30 | 30.00 | 30 | 30 | 30 | 30 | 30 | 30 | 30 | 1.1 |
| Flow | kg/s | 140.49 | 140.40 | 157.17 | 157.17 | 157.17 | 157.17 | 42.43 | 42.43 | 42.43 | 42.43 |
| Composition | | | | | | | | | | | |
| CO2 | mol % | 72.7633 | 72.8651 | 72.5987 | 72.5987 | 72.5987 | 72.5987 | 25.3191 | 25.3191 | 25.3191 | 25.3191 |
| N2 | mol % | 18.9694 | 18.9959 | 18.8951 | 18.8951 | 18.8951 | 18.8951 | 52.4127 | 52.4127 | 52.4127 | 52.4127 |
| Ar | mol % | 2.6956 | 2.6994 | 2.9277 | 2.9277 | 2.9277 | 2.9277 | 7.2751 | 7.2751 | 7.2751 | 7.2751 |
| O2 | mol % | 5.4316 | 5.4392 | 5.5778 | 5.5778 | 5.5778 | 5.5778 | 14.9917 | 14.9917 | 14.9917 | 14.9917 |
| H2O | mol % | 0.1396 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 4.9674 | 4.9744 | 5.6409 | 5.6409 | 5.6409 | 5.6409 | 13.1407 | 13.1407 | 13.1407 | 13.1407 |
| NO2 | ppm | 0.0043 | 0.0043 | 0.0038 | 0.0038 | 0.0038 | 0.0038 | 0.0000 | 0.0000 | 0.0000 | 0.0000 |

| | | \multicolumn{10}{c}{Stream Number} | | | | | | | | | |
|---|---|---|---|---|---|---|---|---|---|---|
| | | 111 | 112 | 113 | 114 | 115 | 116 | 117 | 118 | 119 | 120 |
| Temperature | °C. | −53.70 | −27.43 | −36.99 | −36.92 | 11.70 | 70.83 | 25.00 | −25.48 | −25.48 | −54.70 |
| Pressure | bar a | 30 | 30 | 16.75936 | 16.75936 | 16.75936 | 30 | 30 | 16.75936 | 16.75936 | 5.603787 |
| Flow | kg/s | 114.74 | 114.74 | 114.74 | 16.77 | 16.77 | 16.77 | 16.77 | 97.97 | 43.84 | 43.84 |
| Composition | | | | | | | | | | | |
| CO2 | mol % | 95.2221 | 95.2221 | 95.2221 | 70.3742 | 70.3742 | 70.3742 | 70.3742 | 99.8876 | 99.8876 | 99.8876 |
| N2 | mol % | 2.8569 | 2.8569 | 2.8569 | 18.0534 | 18.0534 | 18.0534 | 18.0534 | 0.0036 | 0.0036 | 0.0036 |
| Ar | mol % | 0.8475 | 0.8475 | 0.8475 | 4.8350 | 4.8350 | 4.8350 | 4.8350 | 0.0988 | 0.0988 | 0.0988 |
| O2 | mol % | 1.0733 | 1.0733 | 1.0733 | 6.7362 | 6.7362 | 6.7362 | 6.7362 | 0.0100 | 0.0100 | 0.0100 |
| H2O | mol % | 0.0000 | 0.0000 | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 | 0.0000 | 0.0000 |
| NO | ppm | 2.0523 | 2.0523 | 2.0523 | 11.2086 | 11.2086 | 11.2086 | 11.2086 | 0.3331 | 0.3331 | 0.3331 |
| NO2 | ppm | 0.0057 | 0.0057 | 0.0057 | 0.0001 | 0.0001 | 0.0001 | 0.0001 | 0.0067 | 0.0067 | 0.0067 |

| | | \multicolumn{8}{c}{Stream Number} | | | | | | | |
|---|---|---|---|---|---|---|---|---|---|
| | | 121 | 122 | 123 | 124 | 125 | 126 | 127 | 128 |
| Temperature | °C. | 11.70 | 92.97 | 25.00 | −25.48 | −28.50 | 11.70 | 2207.11 | 50.00 |
| Pressure | bar a | 5.603787 | 15.11383 | 15.11383 | 16.75936 | 15.11383 | 15.11383 | 110 | 110 |
| Flow | kg/s | 43.84 | 43.84 | 43.84 | 54.13 | 54.13 | 54.13 | 97.97 | 97.97 |
| Composition | | | | | | | | | |
| CO2 | mol % | 99.8876 | 99.8876 | 99.8876 | 99.8876 | 99.8876 | 99.8876 | 99.8876 | 99.8876 |
| N2 | mol % | 0.0036 | 0.0036 | 0.0036 | 0.0036 | 0.0036 | 0.0036 | 0.0036 | 0.0036 |
| Ar | mol % | 0.0988 | 0.0988 | 0.0988 | 0.0988 | 0.0988 | 0.0988 | 0.0988 | 0.0988 |
| O2 | mol % | 0.0100 | 0.0100 | 0.0100 | 0.0100 | 0.0100 | 0.0100 | 0.0100 | 0.0100 |
| H2O | mol % | 0.0000 | 0.0000 | 0.0000 | 0.0000 | 0.0000 | 0.0000 | 0.0000 | 0.0000 |
| SO2 | ppm | 0.0000 | 0.0000 | 0.0000 | 0.0000 | 0.0000 | 0.0000 | 0.0000 | 0.0000 |
| NO | ppm | 0.3331 | 0.3331 | 0.3331 | 0.3331 | 0.3331 | 0.3331 | 0.3331 | 0.3331 |
| NO2 | ppm | 0.0067 | 0.0067 | 0.0067 | 0.0067 | 0.0067 | 0.0067 | 0.0067 | 0.0067 |

EXAMPLE 2

A computer simulation (Aspen Plus Version 2004.1) has been carried out in which the process depicted in FIG. 2 is integrated with a hydrogen PSA system (not shown). The off gas from the PSA system is compressed to 30 bar to form a stream 101 of compressed off gas which is fed to the process. A heat and mass balance table for the simulation is provided in Table 3.

The simulation indicates that the carbon monoxide level can be reduced to about 100 ppm.

Advantages of preferred embodiments of the present invention include:

- improving low temperature carbon dioxide purification;
- producing carbon dioxide at a purity of at least 97 mol %, and usually at least 99 mol %, e.g. 99.9 mol %;
- producing carbon dioxide with a very low level of oxygen or carbon monoxide, e.g. no more than 1000 ppm, typically no more than 100 ppm, and usually about 10 ppm (or even lower if required);
- producing carbon dioxide with very low levels of nitrogen and argon or other contaminants, typically a combined level of no more than 1000 ppm;
- minimal or no increase in overall power consumption compared with the prior art process of FIG. 1 (defined as kWh/tonne of carbon dioxide separated); and
- minimal or no decrease in recovery of carbon dioxide compared with the prior art process of FIG. 1.

It will be appreciated that the invention is not restricted to the details described above with reference to the preferred embodiments but that numerous modifications and variations can be made without departing from the spirit and scope of the invention as defined in the following claims.

The invention claimed is:

1. A method for removing a first contaminant selected from oxygen and carbon monoxide from impure liquid carbon dioxide, said method comprising:
   separating said impure liquid carbon dioxide in a mass transfer separation column system to produce first contaminant-enriched overhead vapor and carbon dioxide-enriched bottoms liquid; and

TABLE 3

| | | Stream Number | | | | | | | | | |
|---|---|---|---|---|---|---|---|---|---|---|---|
| | | 101 | 102 | 103 | 104 | 105 | 106 | 107 | 108 | 109 | 110 |
| Temperature | ° C. | 20.00 | 20.00 | 20.30 | −3.21 | −16.35 | −53.65 | −53.65 | 8.40 | 300.00 | 65.90 |
| Pressure | bar a | 30 | 30.00 | 30 | 30 | 30 | 30 | 30 | 30 | 30 | 1.1 |
| Flow | kg/s | 54.59 | 54.56 | 59.05 | 59.05 | 59.05 | 59.05 | 9.78 | 9.78 | 9.78 | 9.78 |
| Composition | | | | | | | | | | | |
| CO2 | mol % | 71.6016 | 71.6799 | 72.4768 | 72.4768 | 72.4768 | 72.4768 | 23.7484 | 23.7484 | 23.7484 | 23.7484 |
| N2 | mol % | 0.9951 | 0.9962 | 1.0183 | 1.0183 | 1.0183 | 1.0183 | 2.6859 | 2.6859 | 2.6859 | 2.6859 |
| Ar | mol % | 0.1682 | 0.1684 | 0.1836 | 0.1836 | 0.1836 | 0.1836 | 0.4388 | 0.4388 | 0.4388 | 0.4388 |
| H2 | mol % | 21.8609 | 21.8848 | 20.8355 | 20.8355 | 20.8355 | 20.8355 | 59.0303 | 59.0303 | 59.0303 | 59.0303 |
| H2O | mol % | 0.1092 | 0.0000 | 0.0000 | 0.0000 | 0.0000 | 0.0000 | 0.0000 | 0.0000 | 0.0000 | 0.0000 |
| CO | mol % | 4.5819 | 4.5869 | 4.7389 | 4.7389 | 4.7389 | 4.7389 | 12.3553 | 12.3553 | 12.3553 | 12.3553 |
| CH4 | mol % | 0.6830 | 0.6838 | 0.7469 | 0.7469 | 0.7469 | 0.7469 | 1.7413 | 1.7413 | 1.7413 | 1.7413 |
| | | Stream Number | | | | | | | | | |
| | | 111 | 112 | 113 | 114 | 115 | 116 | 117 | 118 | 119 | 120 |
| Temperature | ° C. | −53.65 | −23.91 | −31.45 | −31.03 | 8.40 | 64.23 | 25.00 | −25.11 | −25.11 | −54.65 |
| Pressure | bar a | 30 | 30 | 16.82649 | 16.82649 | 16.82649 | 30 | 30 | 16.82649 | 16.82649 | 5.603904 |
| Flow | kg/s | 49.27 | 49.27 | 49.27 | 4.49 | 4.49 | 4.49 | 4.49 | 44.78 | 18.76 | 18.76 |
| Composition | | | | | | | | | | | |
| CO2 | mol % | 98.3195 | 98.3195 | 98.3195 | 83.8946 | 83.8946 | 83.8946 | 83.8946 | 99.9195 | 99.9195 | 99.9195 |
| N2 | mol % | 0.1339 | 0.1339 | 0.1339 | 1.3351 | 1.3351 | 1.3351 | 1.3351 | 0.0006 | 0.0006 | 0.0006 |
| Ar | mol % | 0.0483 | 0.0483 | 0.0483 | 0.4007 | 0.4007 | 0.4007 | 0.4007 | 0.0092 | 0.0092 | 0.0092 |
| H2 | mol % | 0.5794 | 0.5794 | 0.5794 | 5.8025 | 5.8025 | 5.8025 | 5.8025 | 0.0000 | 0.0000 | 0.0000 |
| H2O | mol % | 0.0000 | 0.0000 | 0.0000 | 0.0000 | 0.0000 | 0.0000 | 0.0000 | 0.0000 | 0.0000 | 0.0000 |
| CO | mol % | 0.6995 | 0.6995 | 0.6995 | 6.9160 | 6.9160 | 6.9160 | 6.9160 | 0.0100 | 0.0100 | 0.0100 |
| CH4 | mol % | 0.2195 | 0.2195 | 0.2195 | 1.6512 | 1.6512 | 1.6512 | 1.6512 | 0.0607 | 0.0607 | 0.0607 |
| | | Stream Number | | | | | | | | | |
| | | 121 | 122 | 123 | 124 | 125 | 126 | 127 | 128 | | |
| Temperature | ° C. | 8.40 | 84.10 | 25.00 | −25.11 | −29.98 | 8.40 | 209.91 | 50.00 | | |
| Pressure | bar a | 5.603904 | 14.27814 | 14.27814 | 16.82649 | 14.27814 | 14.27814 | 110 | 110 | | |
| Flow | kg/s | 18.76 | 18.76 | 18.76 | 26.02 | 26.02 | 26.02 | 44.78 | 44.78 | | |
| Composition | | | | | | | | | | | |
| CO2 | mol % | 99.9195 | 99.9195 | 99.9195 | 99.9195 | 99.9195 | 99.9195 | 99.9195 | 99.9195 | | |
| N2 | mol % | 0.0006 | 0.0006 | 0.0006 | 0.0006 | 0.0006 | 0.0006 | 0.0006 | 0.0006 | | |
| Ar | mol % | 0.0092 | 0.0092 | 0.0092 | 0.0092 | 0.0092 | 0.0092 | 0.0092 | 0.0092 | | |
| H2 | mol % | 0.0000 | 0.0000 | 0.0000 | 0.0000 | 0.0000 | 0.0000 | 0.0000 | 0.0000 | | |
| H2O | mol % | 0.0000 | 0.0000 | 0.0000 | 0.0000 | 0.0000 | 0.0000 | 0.0000 | 0.0000 | | |
| CO | mol % | 0.0100 | 0.0100 | 0.0100 | 0.0100 | 0.0100 | 0.0100 | 0.0100 | 0.0100 | | |
| CH4 | mol % | 0.0607 | 0.0607 | 0.0607 | 0.0607 | 0.0607 | 0.0607 | 0.0607 | 0.0607 | | | reboiling a portion of said carbon dioxide-enriched bottoms liquid by indirect heat exchange against crude carbon dioxide fluid to produce carbon dioxide-enriched vapor for said column system and cooled crude carbon dioxide fluid;

wherein said impure liquid carbon dioxide has a greater concentration of carbon dioxide than said crude carbon dioxide fluid and is derived from said cooled crude carbon dioxide fluid by:

further cooling at least a portion of said cooled crude carbon dioxide fluid by indirect heat exchange to produce partially condensed crude carbon dioxide fluid; and phase separating at least a portion of said partially condensed crude carbon dioxide fluid to produce said impure liquid carbon dioxide and carbon dioxide-depleted vapor, wherein:

the entire refrigeration duty required by the method is provided internally by indirect heat exchange between process streams, at least a portion of said refrigeration duty being provided by vaporizing a portion of the carbon dioxide-enriched bottoms liquid or liquid carbon dioxide derived therefrom by indirect heat exchanger, and the operating pressure of said column system is lower than the pressure of said impure liquid carbon dioxide and the pressure of said impure liquid carbon dioxide being reduced to about the operating pressure of said column system without forming solid carbon dioxide prior to feeding said impure liquid carbon dioxide to said column system.

2. The method according to claim 1 wherein said crude carbon dioxide fluid comprises at least about 60 mol % carbon dioxide.

3. The method according to claim 1 wherein said impure liquid carbon dioxide comprises at least about 90 mol % carbon dioxide.

4. The method according to claim 1 wherein the formation of solid carbon dioxide during pressure reduction is prevented by warming said impure liquid carbon dioxide by indirect heat exchange.

5. The method according to claim 1 comprising:

expanding at least a first part of said carbon dioxide-enriched bottoms liquid to produce an expanded first part at a first pressure; and vaporizing said expanded first part by indirect heat exchange to provide a portion of the refrigeration duty required by the method and produce carbon dioxide gas.

6. The method according to claim 5 wherein the first pressure is from about the triple point pressure for carbon dioxide to about 15 bar.

7. The method according to claim 5 comprising:

expanding at least one further part of said carbon dioxide-enriched bottoms liquid to produce at least one expanded further part having a pressure that is higher than said first pressure; and vaporizing at least a portion of the at least one expanded further part by indirect heat exchange to provide at least a portion of the remaining refrigeration duty required by the method and produce carbon dioxide gas.

8. The method according to claim 7 wherein the pressure of the at least one expanded further part is from about the triple point pressure for carbon dioxide bar to about 20 bar.

9. The method according to claim 7 wherein there is only one further part.

10. The method according to claim 7 wherein there are two further parts expanded to different pressures.

11. The method according to claim 1 comprising:

warming at least a portion of said carbon dioxide-depleted vapor by indirect heat exchange to produce carbon dioxide-depleted gas;

pre-heating at least a portion of said carbon dioxide-depleted gas by indirect heat exchange to produce pre-heated carbon dioxide-depleted gas; and work expanding at least a portion of said pre-heated carbon dioxide-depleted gas to produce expanded carbon dioxide-depleted gas;

wherein at least a portion of the heat required to pre-heat said carbon dioxide-depleted gas is provided by recovering heat of compression from contaminated carbon dioxide gas.

12. The method according to claim 1 wherein at least the majority of refrigeration duty required by the method is provided by vaporization of carbon dioxide-enriched bottoms liquid.

13. The method according to claim 1 comprising:

warming at least a portion of said first contaminant-enriched overhead vapor by indirect heat exchange to produce warmed first contaminant-enriched gas;

compressing at least a portion of said warmed first contaminant-enriched gas to produce compressed first contaminant-enriched gas;

combining at least a portion of said compressed first contaminant-enriched gas with a contaminated carbon dioxide feed gas to form said crude carbon dioxide gas; and cooling at least a portion of said crude carbon dioxide gas by indirect heat exchange prior to providing said reboil to the column system.

14. The method according to claim 13 comprising removing at least a portion of the heat of compression in said compressed first contaminant-enriched gas by indirect heat exchange with a coolant prior to combining with said contaminated carbon dioxide gas.

15. The method according to claim 1 wherein the first contaminant is oxygen.

16. The method according to claim 15 wherein said impure liquid carbon dioxide is obtained from flue gas generated in an oxyfuel combustion process.

17. The method according to claim 1 wherein the first contaminant is carbon monoxide.

18. The method according to claim 17 wherein said impure liquid carbon dioxide is obtained from waste gas from a hydrogen PSA process.

19. The method according to claim 1 wherein the operating pressure(s) of said column system is lower than the pressure of said crude carbon dioxide fluid.

20. The method according to claim 19 wherein the operating pressure(s) of said column system is from about 5 bar to about 50 bar.

21. The method according to claim 19 wherein the pressure of said crude carbon dioxide fluid is from about 15 bar to about 60 bar.

22. A method for recovering carbon dioxide from contaminated carbon dioxide gas comprising a first contaminant selected from the group consisting of oxygen and carbon monoxide, and at least about 60 mol % carbon dioxide, said method comprising:

combining at least a portion of contaminated carbon dioxide gas with compressed first contaminant-enriched gas recycled from downstream to produce crude carbon dioxide gas;

cooling at least a portion of said crude carbon dioxide gas by indirect heat exchange to produce crude carbon dioxide fluid;

separating impure liquid carbon dioxide comprising said first contaminant in a mass transfer separation column system to produce first contaminant-enriched overhead vapor and carbon dioxide-enriched bottoms liquid;

reboiling a portion of said carbon dioxide-enriched bottoms liquid by indirect heat exchange against at least a portion of said crude carbon dioxide fluid to produce carbon dioxide-enriched vapor for said column system and cooled crude carbon dioxide fluid;

further cooling at least a portion of said cooled crude carbon dioxide fluid by indirect heat exchange to produce partially condensed crude carbon dioxide fluid;

phase separating at least a portion of said partially condensed crude carbon dioxide fluid to produce said impure liquid carbon dioxide and carbon dioxide-depleted vapor;

feeding at least a portion of said impure liquid carbon dioxide to said column system for separation;

dividing a portion of said carbon dioxide-enriched bottoms liquid into a first part and at least one further part;

expanding said first part to produce an expanded first part at a first pressure;

vaporizing said expanded first part by indirect heat exchange to provide a portion of the refrigeration duty required by the method and produce carbon dioxide gas;

expanding the at least one further part to produce at least one expanded further part having a pressure that is higher than said first pressure;

vaporizing the at least one expanded further part by indirect heat exchange to provide at least a portion of the remaining refrigeration duty required by the method and produce carbon dioxide gas;

warming at least a portion of said first contaminant-enriched overhead vapor by indirect heat exchange to produce warmed first contaminant-enriched gas;

compressing at least a portion of said warmed first contaminant-enriched gas to produce said compressed first contaminant-enriched gas for recycling to said contaminated carbon dioxide gas; and compressing said carbon dioxide gases to form compressed carbon dioxide gas.

23. The method according to claim 22 wherein said contaminated carbon dioxide gas is derived from flue gas generated in an oxyfuel combustion process.

24. The method according to claim 22 wherein said contaminated carbon dioxide gas is derived from waste gas from a hydrogen PSA process.

* * * * *

UNITED STATES PATENT AND TRADEMARK OFFICE
CERTIFICATE OF CORRECTION

PATENT NO. : 7,819,951 B2　　　　　　　　　　　　　　　　　　　　　　　　Page 1 of 1
APPLICATION NO. : 11/656914
DATED : October 26, 2010
INVENTOR(S) : Vincent White and Rodney John Allam It is certified that error appears in the above-identified patent and that said Letters Patent is hereby corrected as shown below:

Column 25, Line 22

In claim 1 delete the word "exchanger," and insert -- exchange, --

Signed and Sealed this

Fourteenth Day of December, 2010

David J. Kappos
*Director of the United States Patent and Trademark Office*